MOTORS,
Horse power type,
Sweep.
19
Gear
Examiner's Room.
I. J. Richardson,
Horse Power,
No. 87, A. I. Patented May 16, 1848.
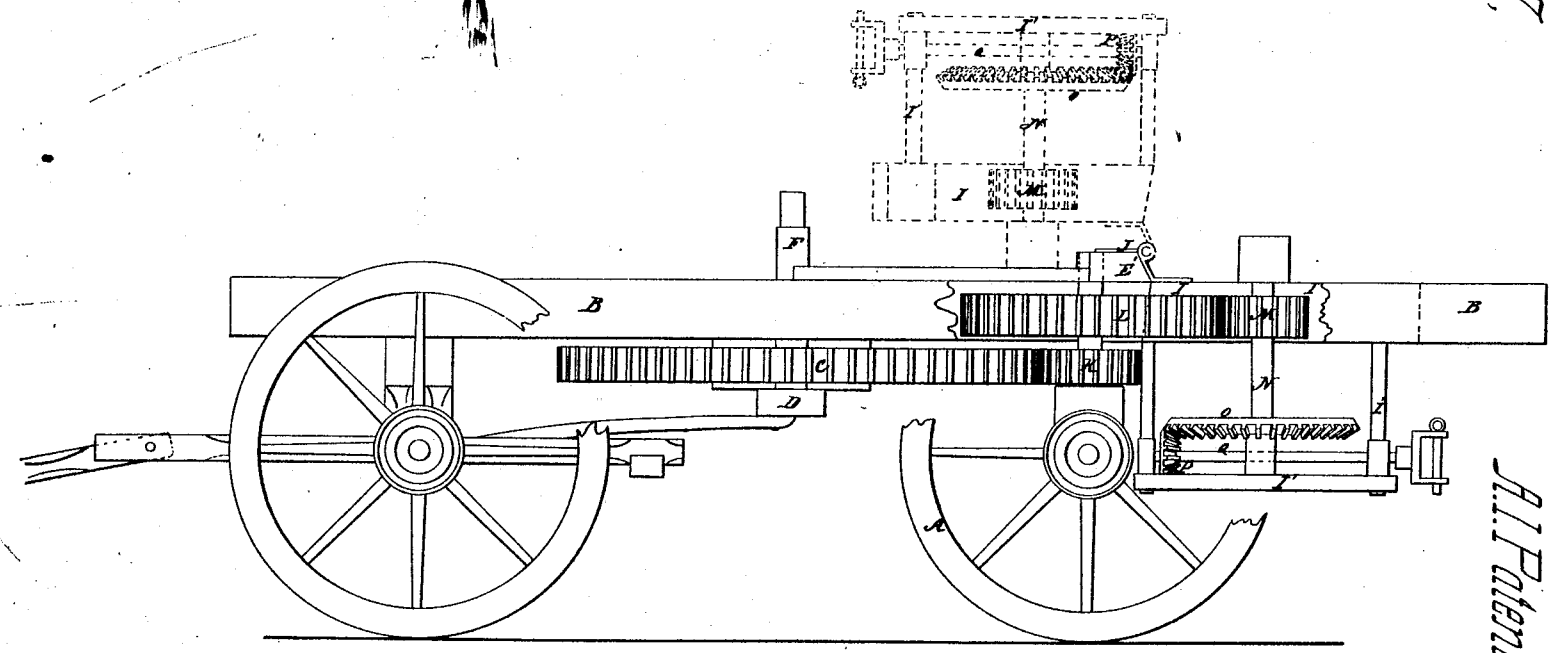
AM. PHOTO-LITHO. CO. N.Y. (OSBORNE'S PROCESS)